US008856239B1

(12) United States Patent
Oliver et al.

(10) Patent No.: US 8,856,239 B1
(45) Date of Patent: Oct. 7, 2014

(54) MESSAGE CLASSIFICATION BASED ON LIKELIHOOD OF SPOOFING

(75) Inventors: Jonathan J. Oliver, San Carlos, CA (US); David A. Koblas, Los Altos, CA (US)

(73) Assignee: SonicWALL, Inc., San Jose, CA (US)

( * ) Notice: Subject to any disclaimer, the term of this patent is extended or adjusted under 35 U.S.C. 154(b) by 1567 days.

(21) Appl. No.: 10/776,677

(22) Filed: Feb. 10, 2004

(51) Int. Cl.
*G06F 15/16* (2006.01)
*H04L 12/893* (2013.01)
*H04L 29/06* (2006.01)

(52) U.S. Cl.
CPC ............ *H04L 47/40* (2013.01); *H04L 63/1466* (2013.01); *H04L 63/1483* (2013.01)
USPC ............................. 709/206; 709/205; 709/207

(58) Field of Classification Search
CPC .. H04L 47/40; H04L 63/1466; H04L 63/1483
USPC .......................................... 709/206, 205, 207
See application file for complete search history.

(56) References Cited

U.S. PATENT DOCUMENTS

| 6,112,227 | A | 8/2000 | Heiner |
| 6,199,102 | B1 | 3/2001 | Cobb |
| 6,650,631 | B1 | 11/2003 | Benash et al. |
| 6,650,890 | B1 | 11/2003 | Irlam et al. |
| 6,941,348 | B2 | 9/2005 | Petry et al. |
| 6,941,466 | B2 | 9/2005 | Mastrianni |
| 7,024,458 | B2 | 4/2006 | Chan et al. |
| 7,039,954 | B2 | 5/2006 | Lingafelt et al. |
| 7,206,814 | B2 * | 4/2007 | Kirsch ........................... 709/206 |
| 7,366,761 | B2 * | 4/2008 | Murray et al. ................. 709/206 |
| 7,366,919 | B1 * | 4/2008 | Sobel et al. .................... 713/150 |
| 8,612,560 | B2 | 12/2013 | Oliver |
| 2003/0233418 | A1 | 12/2003 | Goldman |
| 2004/0024639 | A1 | 2/2004 | Goldman |
| 2004/0068542 | A1 * | 4/2004 | Lalonde et al. ............... 709/206 |
| 2004/0117648 | A1 | 6/2004 | Kissel |
| 2004/0158554 | A1 | 8/2004 | Trottman |
| 2004/0177120 | A1 | 9/2004 | Kirsch |
| 2004/0236838 | A1 | 11/2004 | Tout |
| 2004/0267886 | A1 | 12/2004 | Malik |
| 2005/0025179 | A1 | 2/2005 | McLaggan et al. |
| 2005/0038906 | A1 | 2/2005 | Banes et al. |
| 2005/0055410 | A1 | 3/2005 | Landsman et al. |
| 2005/0076240 | A1 * | 4/2005 | Appleman .................... 713/201 |

(Continued)

FOREIGN PATENT DOCUMENTS

GB 2 366 706 3/2002
JP 2000-163341 6/2000

(Continued)

OTHER PUBLICATIONS

Google Patent Search.*

(Continued)

*Primary Examiner* — Arvin Eskandarnia
(74) *Attorney, Agent, or Firm* — Lewis Roca Rothgerber LLP

(57) ABSTRACT

A technique for classifying a message is disclosed. The technique includes determining the domain from which the message is purported to be sent, determining an IP address from which the message was relayed at some point in its transmission, associating the domain with the IP address, and classifying the message based on the associated domain and IP address.

31 Claims, 6 Drawing Sheets

(56) References Cited

U.S. PATENT DOCUMENTS

| | | | |
|---|---|---|---|
| 2005/0125667 A1 | 6/2005 | Sullivan et al. | |
| 2006/0015942 A1 | 1/2006 | Judge et al. | |
| 2006/0021055 A1 | 1/2006 | Judge et al. | |
| 2006/0129644 A1 | 6/2006 | Owen et al. | |
| 2007/0038718 A1 | 2/2007 | Khoo et al. | |
| 2008/0040439 A1* | 2/2008 | Wang | 709/206 |
| 2008/0104235 A1 | 5/2008 | Oliver | |
| 2008/0147857 A1 | 6/2008 | Oliver | |
| 2008/0219254 A1 | 9/2008 | Haney | |
| 2008/0256210 A1 | 10/2008 | Malik | |

FOREIGN PATENT DOCUMENTS

| | | |
|---|---|---|
| JP | 2003-087327 | 3/2003 |
| JP | 2003-125004 | 4/2003 |
| JP | 2004-240945 | 8/2004 |
| JP | 2004-362559 | 12/2004 |
| JP | 2005-128922 | 5/2005 |
| JP | 2005-135024 | 5/2005 |
| JP | 2005-208780 | 8/2005 |
| WO | WO 99/33188 | 7/1999 |
| WO | WO 01/16695 | 3/2001 |
| WO | WO 01/53965 | 7/2001 |
| WO | WO 02/19069 | 3/2002 |
| WO | WO 2005/041504 | 5/2005 |
| WO | WO 2005/048033 | 5/2005 |

OTHER PUBLICATIONS

Dwork, Cynthia, et al. "Pricing via Processing or Combating Junk Mail," CRYPTO '92, Springer-Verlag LNCS 740, pp. 139-147, 1992.
Von Ahn, Luis, et al., "Telling Humans and COmputers Apart (Automatically) or How Lazy Cryptographers do AI," Communications to the ACM, Feb. 2004.
Skoll, David F., "How to Make Sure a Human is Sending You Mail," Google Groups Thread (Nov. 17, 1996).
Byrne, Julian, "My Spamblock," Google Groups Thread (Jan. 19, 1997).
Guilmette, Ronald F., "To Mung or Not to Mung," Google Groups Thread (Jul. 24, 1997).
Templeton, Brad, "Viking-12 Junk E-Mail Blocker," (believed to have last been updated Jul. 15, 2003).
"Majordomo FAQ," Oct. 20, 2001.
Langberg, Mike, "Spam Foe Needs Filter of Himself," (Email Thread Dated Apr. 5, 2003).
McCullagh, Declan, "In-Boxes that Fight Back," News.com, May 19, 2003.
Cranor, Lorrie, et al., "Spam!," Communications of the ACM, vol. 41, Issue 8, pp. 74-83, Aug. 1998.
Jung, Jaeyeon, et al., "An Empirical Study of Spam Traffic and the Use of DNS Black Lists," IMC'04, Taormina, Sicily, Italy, Oct. 25-27, 2004.
"SMTP+SPF: Sender Policy Framework," Edited Jun. 22, 2004.
Weinstein, Lauren, "Spam Wars," Communications of the ACM, vol. 46, Issue 8, p. 136, Aug. 2003.
Gomes, Luiz, et al., "Characterizing a Spam Traffic," in the Proc. of the 4th ACM SIGCOMM Conference on Internet Measurement, Sicily, Italy, pp. 356-369, 2004.
McWilliams, Brian, "Cloaking Device Made for Spammers," Wired News, Oct. 9, 2003.
Gabrilovich et al., "The Homograph Attack", Communications of the ACM, 45(2):128, Feb. 2002.
Kirda et al., "Protecting Users Against Phishing Attacks with AntiPhish," IEEE Proc. of the 29th Ann. Int'l Comp. Software and App. Conference, 2005.
Merwe et al., "Characteristics and Responsibilities Involved in a Phishing Attack," 2005.
"FBI Says Web 'Spoofing' Scams are a Growing Problem," Federal Bureau of Investigation Press Release, Jul. 21, 2003.
Razor-agents 2.22, http://razor.sourceforge.net, (2004).
Kolathur, Satheesh and Subramanian, Subha, "Spam Filter, A collaborative Method of Eliminating Spam" White paper, Dec. 8, 2000, http://www.cs.uh.edu/~kolathur/Paper.htm.
Spamassassin, "Welcome to SpamAssassin", http://spamassassin.org, (2004).
Cloudmark, Inc., The Application of "Genetic Classsification" as a Means to Predict and Extinguish E-mail Spam in the Corporate Enterprise, White Paper, Nov. 2003, USA.
Symantec, Brightmail Reputation Service, http://www.brightmail.com, (2004).
Ironport Systems, Inc., Microsoft Offers Anti-Spam Capabilities to Distinguish Legitimate E-Mail, May 5, 2004.
John Levine, Objections Addressed, http://spf.pobox.com/objections.html, (2004).
Microsoft, Microsoft Is Committed to Help the Spam Epidemic, Nov. 16, 2003, http://www.microsoft.com/mscorp/twc/privacy/spam.mspx.
AOL Postmaster.Info, Sender Policy Framework, http://postmaster.aol.com/spf/details.html, (2004).
AOL Postmaster.Info, SPF Information, http://postmaster.aol.com/spf/, (2006).
Sender Policy Framework, http://spf.pobox.com, (2004).
U.S. Appl. No. 11/927,477 Final Office Action mailed Feb. 8, 2013.
U.S. Appl. No. 12/070,164 Final Office Action mailed May 28, 2009.
U.S. Appl. No. 12/070,164 Office Action mailed Nov. 24, 2008.

* cited by examiner

200

```
Return-Path: <martin.williams@anybank.net>
Received: from alpine.corp.mailfrontier.com (alpine [10.1.1.4])      —— 204
        by mtbuller.corp.mailfrontier.com (8.11.6/8.11.6) with ESMTP id
hA2Knsf22638
        for <probe@mtbuller.corp.mailfrontier.com>; Sun, 2 Nov 2003
12:53:25 -0800
                                                                      —— 208
Received: from yoyodyne.heyx.com ([216.218.255.139])
        by alpine.corp.mailfrontier.com (8.11.6/8.11.6) with ESMTP id
hA2KnrW05969
        for <extra@mailtorch.com>; Sun, 2 Nov 2003 12:50:56 -0800
Received: by yoyodyne.heyx.com (Postfix)
        id CF79D42256; Sun,  2 Nov 2003 12:49:47 -0800 (PST)
Delivered-To: spamprobe@heyx.com
Received: from h0010dc3baf84.ne.client2.attbi.com
(h0010dc3baf84.ne.client2.attbi.com [24.128.150.127])              —— 216
        by yoyodyne.heyx.com (Postfix) with SMTP id 9E9D842254          220
        for <joes@extra.com>; Sun,  2 Nov 2003 12:49:40 -0800 (PST)    /
------------------------------------------------------------------------
Received: from bigfoot.com [126.123.117.239] by           ———— 202
h0010dc3baf84.ne.client2.attbi.com (Postfix) with ESMTP id 571CA5A1B04D for
<joes@extra.com>; Mon, 03 Nov 2003 04:47:47 +0000
Date: Mon, 03 Nov 2003 04:47:47 +0000
                                                          —— 224
From: Martin Williams <martin.williams@anybank.net>
Subject: Important information from Anybank Billing department
To: Joes <joes@extra.com>
References: <18DD62774ED486B9@extra.com>
In-Reply-To: <18DD62774ED486B9@extra.com>
Message-ID: <E00FCA57B07FE0DF@anybank.net>
Reply-To: User <user@some.com>
Sender: John Williams <john.williams@earthlink.net>
MIME-Version: 1.0
Content-Type: text/html
Content-Transfer-Encoding: 8bit
```

MESSAGE CLASSIFICATION BASED ON LIKELIHOOD OF SPOOFING

FIELD OF THE INVENTION

The present invention relates generally electronic messages. More specifically, a technique for classifying messages is disclosed.

BACKGROUND OF THE INVENTION

Electronic messages have become an indispensable part of modern communication. Electronic messages such as email or instant messages are popular because they are fast, easy, and have essentially no incremental cost. Unfortunately, these advantages of electronic messages are also exploited by marketers who regularly send out unsolicited junk messages. The junk messages are referred to as "spam", and spam senders are referred to as "spammers". Spam messages are a nuisance to users. They clog email inboxes, waste system resources, often promote distasteful subjects, and sometimes sponsor outright scams.

There are a number of commonly used techniques for classifying messages and identifying spam, such as black listing the sender addresses of known spammers. However, these techniques sometimes misclassify spam messages. For example, a system that performs black listing may be configured to identify any messages with certain sender addresses, such as "john@getrichquick.com" as spam. However, spammers can insert a false sender address into a spam message, enabling the spam message to pass through the black listing filter. Another problem is that spammers may spoof a genuine sender address or domain that has been whitelisted by a user. It would be useful to have a technique that more accurately classifies messages. Such a technique would not be effective if spammers could easily alter parts of the spam messages they send so that the messages are identified as non-spam. Thus, it would also be desirable if non-spam messages identified by such a technique are not easily spoofed or if such spoofing could be detected.

BRIEF DESCRIPTION OF THE DRAWINGS

Various embodiments of the invention are disclosed in the following detailed description and the accompanying drawings.

FIG. 2A is a diagram illustrating an email message header.

DETAILED DESCRIPTION

Figure 1A:
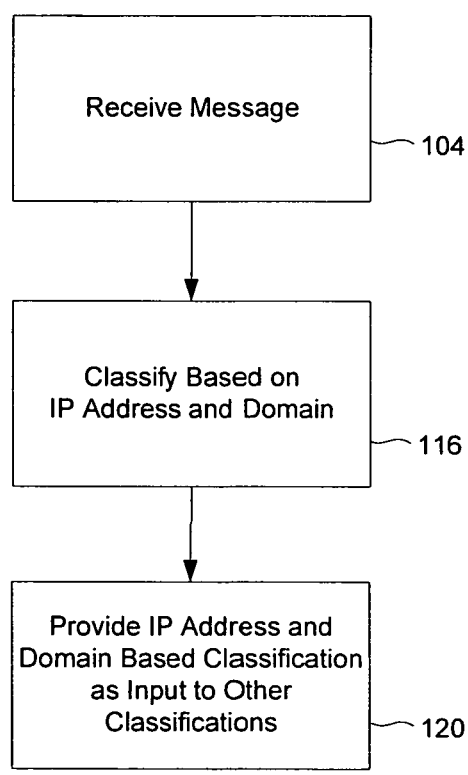
FIG. 1A is a flowchart illustrating processing a message by a system that includes IP address and domain based classification.

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and invention may be practiced according to the claims without some or all of these specific details. For the purpose of clarity, technical material that is known in the technical fields related to the invention has not been described in detail so that the invention is not unnecessarily obscured.

An incoming message can be classified based on one or more IP addresses and a domain (or domain name) associated with the message. In some embodiments, the message is classified based on previous classifications made to an IP address and domain pair. For example, if an IP address and domain pair is associated with a significant number of messages previously classified as spam, the next incoming message associated with that IP address and domain may be classified as spam. Additionally, other classifications of related IP address and domain pairs may inform the classification of a given IP address and domain pair as is described below. A related pair may be a pair with the same domain name but a different IP address or a pair with a different domain name and the same IP address. Accordingly, a particular IP address and domain pair may develop a "reputation" for being associated with spam. This and other techniques for classifying a message based on IP address and domain are described below.

As used herein, a message refers to an email message, an instant message, a text message, and/or any other information transmitted electronically. In the following examples, processing email messages is discussed in detail. The disclosed techniques are also applicable to any other types of messages.

Classifying, as used herein, includes any determination made about a message. This determination can include the type of message, the probability that the message is a particular type of message, or a level of suspiciousness associated with the message. Classifying may include any determination of the nature of a message including determining that it is likely to be spoofed or determining that it is appropriate to override a white list or a black list that controls the disposition of such a message. A message may be determined to be spam, non-spam, or likely to be spam. A message me be considered suspicious because it doesn't appear to come from the domain it is purported to come from.

FIG. 1A is a flowchart illustrating processing a message by a system that includes IP address and domain based classification. In this example, an IP address and domain based classification generates information that can be used as part of an overall classification. An incoming message is received (104). The message is classified based on IP address and domain (116). A typical message header includes an IP address and domain for each hop along the path the message took between the sender and recipient. Any number of these IP addresses and domains can be used to classify the message. In the following examples, classification based on one IP address and domain pair is discussed in detail. In other embodiments, classification is based on multiple IP addresses and domains.

Classifying the message based on an IP address and domain can be done in numerous ways. For example, an IP address and domain pair associated with known friends can be white listed. The message can be classified by consulting a record of previous classifications made to messages with the same IP address and domain. For example, if a user receives messages from a company with domain anycompany.com and the company only sends messages from a particular set of good IP addresses, then over time, the good IP addresses become associated with anycompany.com. It is difficult for a spammer to send a spam message with a forged sender domain of "anycompany.com" which also forges the boundary IP address. Therefore, if anycompany.com is whitelisted, it is very likely that messages purporting to be from anycompany.com originating from the IP addresses that have become associated with anycompany.com should enjoy automatic acceptance as a result of the whitelist. Messages with a sender domain of "anycompany.com" and any other IP address can be treated differently than messages from IP addresses that over time have become associated with anycompany.com. They may be classified as suspicious until enough good messages are received from the new IP address for it to become associated with the domain.

The resulting IP address and domain based classification may be provided as input to other classifiers (120). In general, the IP address and domain classification may work with other classifiers in various manners. It may output information to other classifiers or it may use information from other classifiers as input to its classification process or it may determine whether a classification made by another classifier can be trusted. Any available classifiers can be used, including machine or user based classifiers. For example, the classification can be provided as input to a Bayesian classifier. A white list can be overridden if the IP address and domain based classification provides compelling evidence that the message was not really sent from the stated sender domain. Further examples of this are described below.

Basing a classification on an IP address and domain associated with the message forces spammers to forge both the IP address and domain, which may be difficult if not impossible, depending on the network configuration. Furthermore, the spammer must forge the same IP address and domain extracted by the classifier for classification.

Figure 1B:
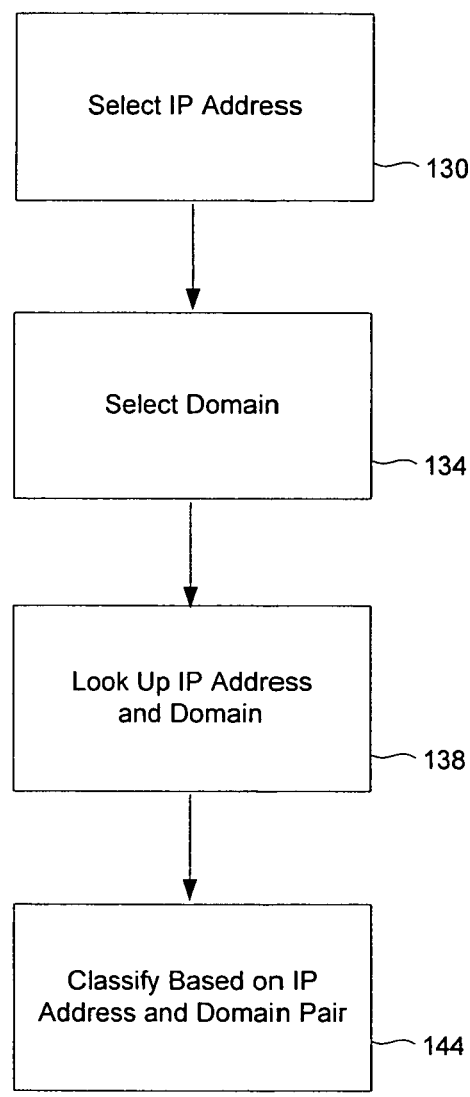
FIG. 1B is a flowchart illustrating a technique for classifying a message based on IP address and domain.
Figure 2B:
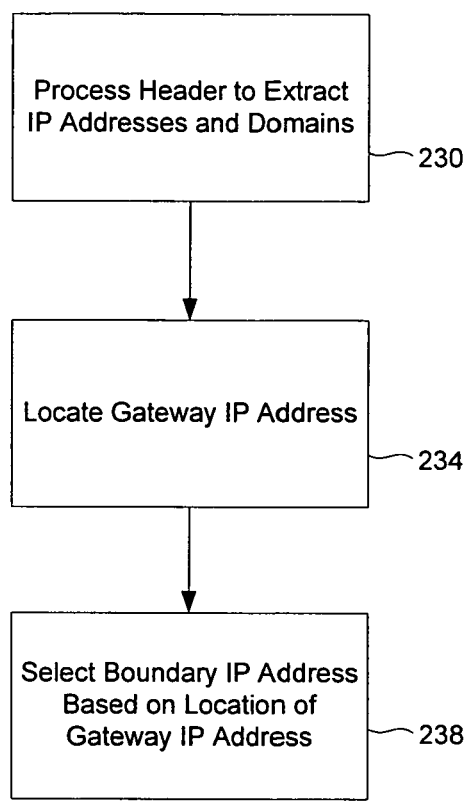
FIG. 2B is a flowchart illustrating determining the boundary IP address of an email message.

FIG. 1B is a flowchart illustrating a technique for classifying a message based on IP address and domain. This flowchart provides further details of step 116 in FIG. 1A. In this example, an IP address associated with a message is selected (130). A message is typically associated with more than one IP address, as shown in FIG. 2A. FIGS. 2A and 2B are discussed in detail for explanatory purposes before returning to FIG. 1B.

FIG. 2A is a diagram illustrating an email message header 200. A typical message header includes an IP address and domain for each hop along the path the message took between the sender and recipient. For example, email header 200 shows that the message was last received from IP address 204 (10.1.1.4 with domain alpine.corp.mailfrontier.com). Prior to that, it was received from IP address 208 (216.218.255.139 with domain yoyodyne.heyx.com), and so on. An IP address from this chain should be selected for the IP address and domain pair. For example, the stated originating IP address 202 (126.123.117.239 with domain bigfoot.com) could be selected. However, the selected IP address is preferably the boundary IP address.

Typically, the boundary IP address is the IP address one hop below the gateway LP address in the chain of IP addresses shown in the header. The boundary IP address can also be selected to be more than one hop below the gateway IP address. For example, in message header 200, IP address 208 belongs to a known gateway within the user's network. IP address 216 (24.128.150.127 with domain h0010dc3baf84.ne.client2.attbi.com with IP address) is one hop from the gateway just outside the user's local network. In this example, IP address 216 is the boundary IP address.

In FIG. 2A, boundary line 220 divides designated trusted IP addresses from distrusted IP addresses. Those IP addresses in the chain above boundary line 220 are designated as trusted. These IP addresses, with the exception of the boundary IP address itself, are internal to the user's network. Those IP addresses in the chain below boundary line 220 are designated as distrusted because they are outside of the user's network. This trust typically weakens moving down the chain because it becomes easier to forge IP addresses. Thus, the boundary IP address can be considered the most trusted IP address outside the user's local network.

There are numerous ways in which the boundary IP address can be determined. The boundary IP address can be learned or preconfigured. For example, the boundary IP address can be learned by detecting a pattern after a certain number of messages are received. The boundary IP address can be adaptively determined. The boundary IP address can also be preconfigured. For example, the user may already know the number of hops to the gateway. Once the gateway is found within the message, the boundary IP address can be defined to be an appropriate number of hops away from the gateway IP address. In some embodiments, the system may check for consistency between the user preconfigured gateway IP address and whether that IP address actually appears to belong to the gateway. In some embodiments, the technique shown in FIG. 2B is used to determine the boundary IP address.

FIG. 2B is a flowchart illustrating determining the boundary IP address of an email message. In this example, the header is first processed to extract the IP addresses and domains (230). The top level domain and IP addresses (in brackets) can be extracted from each "Received: from" line and placed in an array. For example, the array of IP addresses and domains for header 200 can be as follows:

Received_Chain[0]=alpine.corp.mailfrontier.com (alpine [10.1.1.4])
Received_Chain[1]=yoyodyne.heyx.com ([216.218.255.139])
Received_Chain[2]=h0010dc3baf84.ne.client2.attbi.com (h0010dc3baf84.ne.client2.attbi.com [24.128.150.127])]
Received_Chain[3]=bigfoot.com [126.123.117.239]

where Received_Chain is the array of IP addresses and domains.

The gateway IP address is then located (234). In this example, the gateway IP address is a known IP address within the user's network. For example, in header 200, IP address 208 is located in Received_Chain[1]. Any appropriate method for finding a known value within an array may be used. For example, a simple march down the array can be performed, with a comparison performed at each step. The boundary IP address is then selected based on the location of the gateway IP address (238). For example, the IP address after the gateway address can be selected as the boundary IP address. In the case of header 200, the boundary IP would then be Received_Chain[2]. If a gateway IP address is not located, the last IP address can be designated the boundary IP address.

There are numerous other techniques that can be used to determine the boundary IP address of an email message. For example, in addition to considering the IP addresses that a message traverses, reverse domain information can be considered. As long as the reverse domain information indicates that the domain is the same, then the domain and associated IP address can be considered trusted.

Referring further to FIG. 1B, in addition to an IP address, a domain associated with the message is selected (134). Any domain associated with the message can be selected. A domain can include a full email address. Preferably, the domain is the stated sender domain. In message header 200, sender address 224 is shown to be "martin.williams@anybank.net". Therefore, the stated sender domain in this message is "anybank.net".

Once an appropriate IP address and domain are selected, they can be looked up (138) in a reputation table. The reputation table can be stored in any appropriate form, such as in a database or spreadsheet. The reputation table includes information about previous classifications made to various IP address and domain pairs. In some embodiments, the reputation table can be implemented as shown in FIG. 3.

Figure 3:
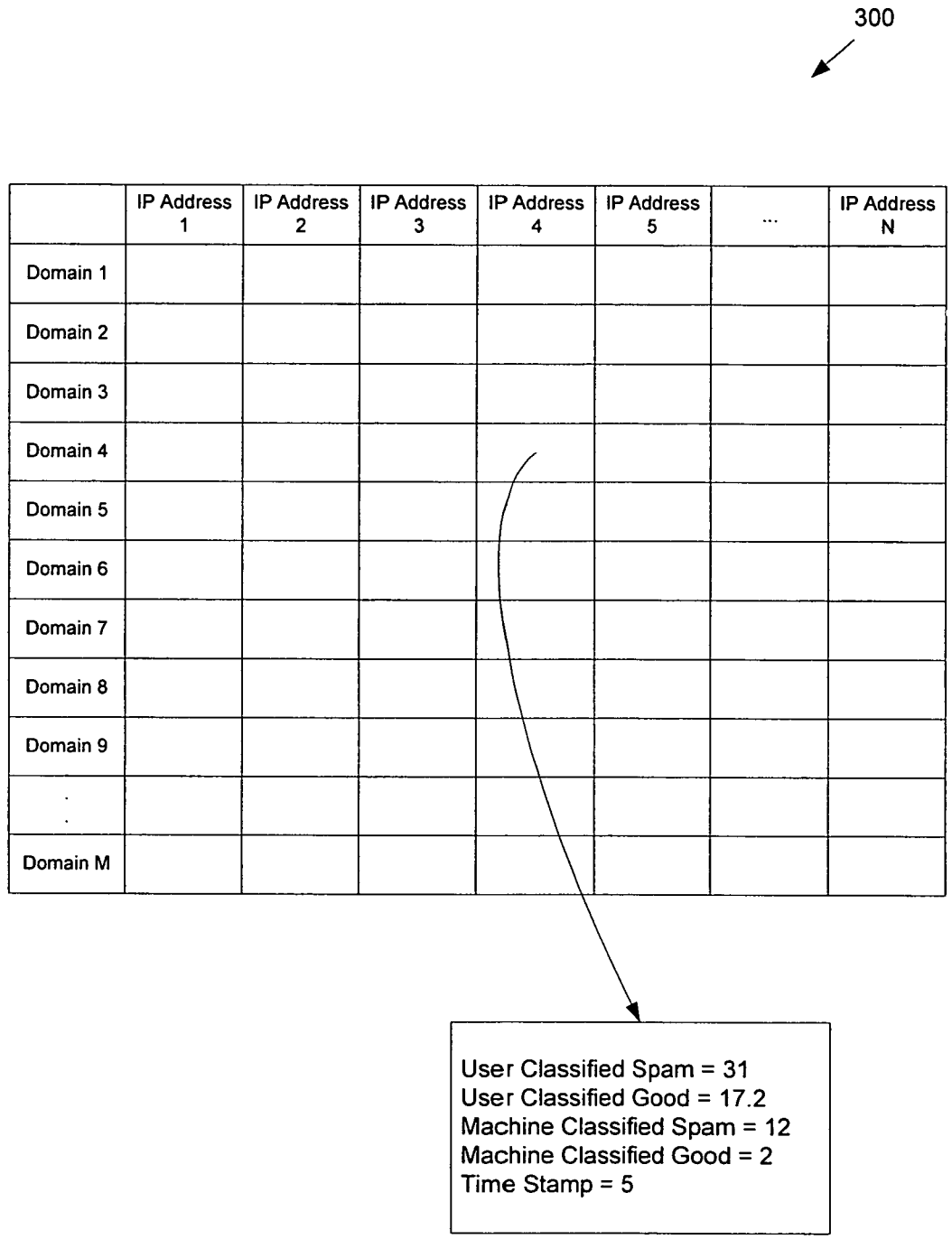
FIG. 3 is a diagram illustrating an example of a reputation table.

FIG. 3 is a diagram illustrating an example of a reputation table 300. Each cell is indexed by a domain and an IP address. Each cell stores information that can be used to make a determination about messages associated with that IP address and domain pair. In some embodiments, information is stored in the form of classification variables. For example, a classification variable could include a count of previous classifications made to the IP address and domain pair. In table 300, the following classification variables are shown:

user_classified_spam is a count of the number of messages classified as spam by the user. For example, if a user moves a message from an inbox to a junk folder, user_classified_spam is incremented.

user_classified_good is a count of the number of messages classified as good by the user. For example, if a user moves a message from a junk folder to an inbox, user_classified_good is incremented.

machine_classified_spam is a count of the number of messages classified as spam by a machine.

machine_classified_good is a count of the number of messages classified as good by a machine.

time_stamp indicates the time at which the last message was received.

It should be noted that the variables shown in this example are just one example of the many types of information that can be stored in a cell. The information stored in the cell can come from many sources, such as probe accounts or a user junking (moving a message from an inbox to a junk folder) or unjunking (moving a message from a junk folder to an inbox) a message.

Referring back to the example, when an incoming message is classified by a user, the cell corresponding to the stated sender domain and boundary IP address of the message is accessed. If the message is classified as good, user_classified_good is incremented, and if the message is classified as spam, user_classified_spam is incremented. Time stamp is also updated to indicate the time the incoming message was received. Likewise, if the incoming message is classified by a machine, machine_classified_spam or machine_classified_good are updated similarly. Thus, a reputation table can be constructed and maintained to reflect previous classifications of received messages.

In some embodiments, when an incoming message is classified as indeterminate (for example, the probability that the message is spam is 0.4-0.6), and there is no subsequent spam classification by the user (e.g., the user does not junk the message), user_classified_good is incremented by a fractional amount. For example, user_classified_good can be incremented by $1/10$.

In some embodiments, the classification variables are decayed over time to reduce the effects of older classifications. Older classifications may be considered less reliable due to changes that may occur over time. The classification variables can be decayed just prior to incrementing a classification variable, at periodic intervals, or at any other time. Decaying the classification variables can be performed in various ways. For example, a linear or exponential decay can be performed.

Referring further to FIG. 1B, once an appropriate IP address and domain are selected and they are accessed in a reputation table, the message is classified based on the IP address and domain pair (144). There are many ways in which the classification can be performed. For example, the classification can be performed by forming a score based on the classification variables. In some embodiments, the score is a ratio of spam classifications to good classifications. A spam ratio can be formed as follows:

$$\text{spam\_ratio} = (\text{user\_classified\_spam} + \text{machine\_classified\_spam} + 1)/(\text{user\_classified\_good} + \text{machine\_classified\_good} + 1) \quad \text{(Equation 1)}$$

The classification variables can also be decayed with time, in which case the spam_ratio becomes an estimated instantaneous spam ratio.

Since a user's decisions are typically the most reliable classification, the machine classification is given less weight in some embodiments. In this case, a spam ratio can be formed as follows:

$$\text{spam\_ratio} = (\text{user\_classified\_spam} + \text{weight}*\text{machine\_classified\_spam} + 1)/(\text{user\_classified\_good} + \text{weight}*\text{machine\_classified\_good} + 1) \quad \text{(Equation 2)}$$

where
0<weight<1

For example, if weight=$1/10$, the machine based classifications have $1/10$ of the effect of the user based classifications. The weight is not necessarily the same in all cells.

Once the spam ratio is determined, a classification can be made based on the ratio. A spam ratio is just one of many possible scores that can be used. For example, a spam rate can also be used, where:

spam_rate=(user_classified_spam+machine_classified_spam+1)/(user_classified_good+machine_classified_good+user_classified_spam+machine_classified_spam+1)

These techniques may be used to classify messages for an individual user or a group of users. In some embodiments, the users share a classifier that is updated when a message is classified. For example, a global reputation table can be stored on a server and updated and accessed by a plurality of users and machines on a local area network. In some embodiments, the users have their own message classifiers. When a message is classified, the message classifiers of the individual users are updated.

The information in the reputation table can be used in numerous ways to classify a message. For example, information in different cells may be compared and used to classify a message that corresponds to a cell. Information from the row or column associated with the cell can be used. For example, if a message arrives with the domain "shoppingdomain", scores for the entire row corresponding to "shoppingdomain.com" may indicate spam in most or all cells in the row, indicating that many users have received what they consider to be spam from that domain. If the cell corresponding to an incoming message indicates spam but the user has the domain white listed, the white list should override the community classification because common spam classification among most of the IP addresses associated with the domain is an indication that the domain is not being spoofed by the current IP address. More likely, the case is that the user has whitelisted a domain that most users consider to be sending spam. That is, most users on the network have classified messages from "shoppingdomain.com" as junk in the past, but this particular user actually wants to receive messages from "shoppingdomain.com".

In another example, assume that "bigcompanydomain.com" belongs to a big company that frequently sends good messages. However, "bigcompanydomain.com" is also often forged by spammers. Over time, certain cells in the row will gain a good reputation. These cells correspond to legitimate IP addresses associated with "bigcompanydomain.com". If a message arrives that falls into another cell in that row, that message may be classified as spam even if the user has that domain white listed, because of the strong evidence that that IP address is not a legitimate one.

Figure 4:
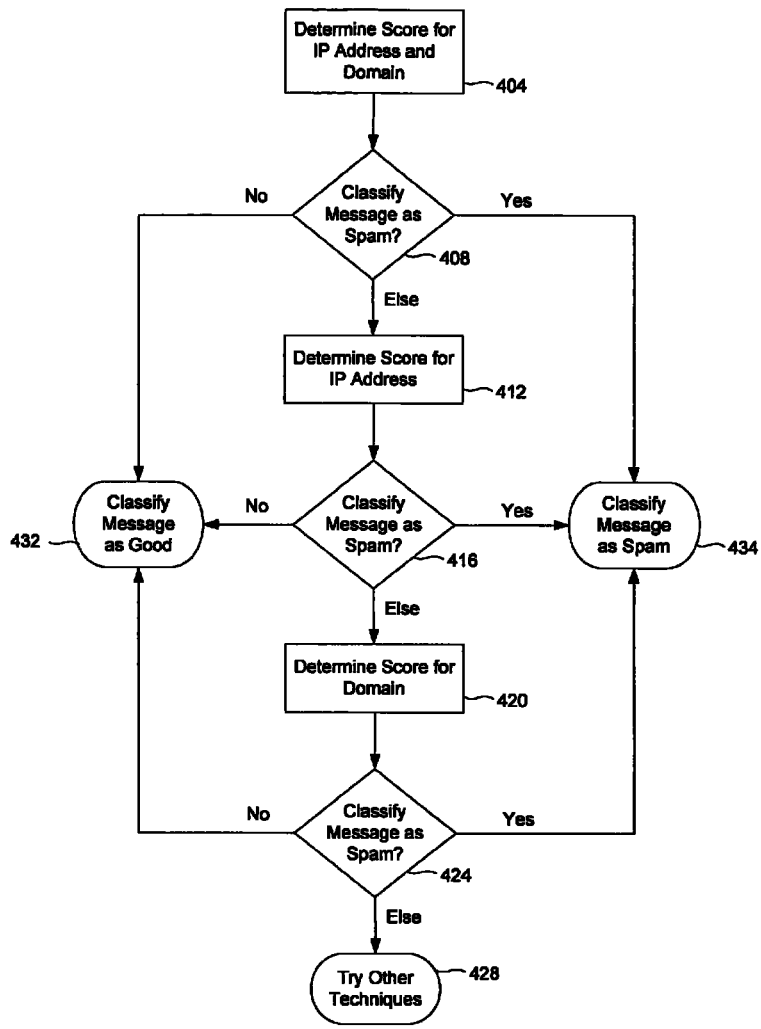
FIG. 4 is a flowchart illustrating one possible approach for classifying a message based on an IP address and domain pair.

FIG. 4 is a flowchart illustrating one possible approach for classifying a message based on an IP address and domain pair. In this example, initially, a score is determined for the domain and IP address pair (404). In some embodiments, the score is a spam ratio. Accordingly, the cell corresponding to the domain and IP address is accessed, and the classification variables within that cell are used to calculate a spam ratio according to Equation 1 or Equation 2. It is determined whether the message is spam (408) based on the calculated spam ratio. The message is then classified as good (432) or spam (434). If there is not enough information available, the message remains unclassified.

If the message remains unclassified, a score is then determined for the IP address (412). If the score is a spam ratio, the column corresponding to the IP address is accessed, and the classification variables within those cells are combined to calculate a spam ratio for that IP address. For example, a spam ratio for an IP address can be calculated as follows:

$$\text{spam\_ratio} = (\Sigma \text{user\_classified\_spam} + \Sigma \text{machine\_classified\_spam} + 1) / (\Sigma \text{user\_classified\_good} + \Sigma \text{machine\_classified\_good} + 1) \quad \text{(Equation 3)}$$

where the summations are over the column corresponding to the IP address.

In embodiments where machine classifications are given less weight than user classifications, a spam ratio can be formed as follows:

$$\text{spam\_ratio} = (\Sigma \text{user\_classified\_spam} + \text{weight} * \Sigma \text{machine\_classified\_spam} + 1) / (\Sigma \text{user\_classified\_good} + \text{weight} * \Sigma \text{machine\_classified\_good} + 1) \quad \text{(Equation 4)}$$

where
$0 < \text{weight} < 1$

There are numerous other ways in which the classification variables can be combined. For example, the spam ratio for an IP address can be calculated by averaging the spam ratios of each cell in the column corresponding to that IP address.

It is determined whether the message is spam (416) based on the calculated spam ratio for the IP address. The message is then classified as good (432) or spam (434). If there is not enough information available, the message remains unclassified.

If the message remains unclassified, a score is then determined for the domain (420). If the score is a spam ratio, the row corresponding to the domain is accessed, and the classification variables within those cells are combined to calculate a spam ratio for that domain. There are numerous ways in which the classification variables can be combined. For example, a spam ratio for a domain can be calculated as shown in Equation 3 or Equation 4, only the summations are over the row corresponding to the domain. Alternatively, the spam ratio for a domain can be calculated by averaging the spam ratios of each cell in the row corresponding to that domain.

It is determined whether the message is spam (424) based on the calculated spam ratio for the IP address. The message is then classified as good (432) or spam (434). If there is not enough information available, the message remains unclassified. Finally, if the message remains unclassified, other classification techniques can be attempted (428).

The steps shown in this example can be performed in any order. In this example, the score for the IP address is shown to be checked (412) before the score for the domain name is checked (420). This is because an IP address is typically a stronger indicator of spam. It may be desirable, however, to swap step 412 with step 420. For example, if a legitimate sender has developed a good reputation with a particular domain and switches email servers, his IP address changes, but his domain remains the same. If the score for the domain is checked first, it can be determined sooner that the message is good.

In a more specific example, assume that a user's bank "Good Bank" sends periodic bank statements to the user from an email address "statements@goodbank.com" with an IP address "123.456.789". Over time, that IP address and domain pair (123.456.789, goodbank.com) gain a good reputation. If Good Bank changes its email server, the IP address will change and the reputation of that IP address and domain pair is initially lost. However, if the score for the domain "goodbank.com" is determined, its good reputation should remain in most cases. Thus, it may be desirable to classify based on the domain (420) before classifying based on the IP address (412).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of classifying a message transmitted over a network, the method comprising:
    maintaining a reputation table in memory, the reputation table including information regarding a plurality of address-domain pairs, each of the plurality of address-domain pairs indicating an IP address and an associated domain of a previously received message, the information regarding each of the plurality of address-domain pairs including a score based on one or more classification variables, the one or more classification variables decaying with time;
    receiving the message transmitted over the network and addressed to a recipient; and
    executing instructions stored in a non-transitory computer readable storage medium to:
    determine an associated domain from which the received message is purported to be sent,
    identify that the determined domain appears on a whitelist associated with the recipient,
    determine an IP address corresponding to a device from which the received message was relayed, associate the determined domain with the IP address to create an address-domain pair for the received message;

assign a score to the received message, the score comprising a ratio of a first classification variable of the address-domain pair to a second classification variable of the address-domain pair as indicated by the reputation table, wherein the score is indicative of spam;

determine whether the domain has been spoofed based on whether a common classification appears across a plurality of IP addresses associated with the domain, wherein:

the domain is determined not to be spoofed if the received message is on the whitelist but has common spam classification appearing across the plurality of IP addresses, and the domain is determined to be spoofed if the received message is on the whitelist but has different classifications appearing across the plurality of IP addresses, and classify the received message based on the determination whether the domain has been spoofed, wherein the spam score is overridden and the received message is classified as good in accordance with the whitelist, the good classification based on the determination that the domain has not been spoofed, and the whitelist is overridden and the received message is classified as spam in accordance with the spam score assigned to the address-domain pair, the spam classification based on different classifications appearing across the plurality of IP addresses associated with the determination that the domain has been spoofed.

2. The method of claim 1, wherein classifying the received message is further based on classification variables associated with another address-domain pair, the other address-domain pair having a related IP address or related domain.

3. The method of claim 1, wherein classifying the received message is further based on classifications of other messages associated with the domain of the received message, the other messages further being associated with IP addresses other than the IP address of the received message.

4. The method of claim 1, wherein a plurality of IP addresses is associated with the domain.

5. The method of claim 1, wherein the IP address is associated with a plurality of domains.

6. The method of claim 1, wherein the IP address is a boundary IP address.

7. The method of claim 1, wherein the IP address is pre-configured.

8. The method of claim 1, wherein the IP address is pre-configured to be one hop from a gateway IP address.

9. The method of claim 1, wherein the IP address is learned.

10. The method of claim 9, wherein the IP address is a boundary IP address and wherein the boundary IP address is learned by detecting a pattern in a certain number of previously received messages.

11. The method of claim 1, wherein the IP address is adaptively determined.

12. The method of claim 1, wherein determining the domain from which the received message is purported to be sent includes identifying a stated sender domain associated with the received message.

13. The method of claim 1, wherein the domain is a domain associated with a boundary IP address.

14. The method of claim 1, wherein classifying the received message is further based on consulting a black list.

15. The method of claim 1, wherein classifying the received message is further based on previous classifications made to the address-domain pair.

16. The method of claim 1, wherein assigning the score includes determining a spam ratio.

17. The method of claim 1, wherein assigning the score includes determining a spam rate.

18. The method of claim 1, wherein assigning the score includes determining an estimated instantaneous spam rate.

19. The method of claim 1, wherein assigning the score includes giving one of the classification variables greater weight relative to another one of the classification variables.

20. The method of claim 19, wherein giving greater weight to one of the classification variables includes giving one of the classification variables associated with user classification greater weight relative to a classification variable associated with computer classification.

21. The method of claim 1, wherein assigning the score includes giving an indeterminate classification a fraction of the weight of a good classification.

22. The method of claim 1, wherein the reputation table is indexed by IP address and domain.

23. The method of claim 1, wherein each cell of the reputation table includes information about previous classifications.

24. The method of claim 1, further comprising providing the classification of the received message based on the address-domain pair as input to another classifier.

25. The method of claim 24, wherein the other classifier is a Bayesian classifier.

26. The method of claim 1, wherein classifying the received message is further based on a score assigned to the IP address.

27. The method of claim 26, further comprising determining the score assigned to the IP address.

28. The method of claim 1, wherein classifying the received message is further based on a score assigned to the domain.

29. The method of claim 28, further comprising determining the score assigned to the domain.

30. The method of claim 1, further comprising determining that the domain of the received message was forged based on the score assigned to the domain.

31. A non-transitory computer-readable storage medium having embodied thereon a program, the program being executable by a processor to perform a method for classifying a message transmitted over a network the method comprising:

determining an associated domain from which a received message is purported to be sent;

identifying that the determined domain appears on a whitelist associated with a recipient of the received message, determining an IF address from which the received message was relayed;

associating the determined domain with the IP address to create an address-domain pair for the received message;

assigning a score to the received message, the score indicative of spam and comprising a ratio of a first classification variable of the address-domain pair to a second classification variable of the address-domain pair, the first classification variable and the second classification variable indicated by a reputation table including information regarding a plurality of address-domain pairs, each of the plurality of address-domain pairs indicating an IP address and an associated domain of a previously received message, the information regarding each of the plurality of address-domain pairs including a score based on one or more classification variables, the one or more classification variables decaying with time, determining whether the domain has been spoofed based on whether a common classification appears across a plurality of IP addresses associated with the domain, wherein:

the domain is determined not to be spoofed if the received message is on the whitelist but has common spam classification appearing across the plurality of IP addresses, and the domain is determined to be spoofed if the received message is on the whitelist but has different classifications appearing across the plurality of IP addresses, and classifying the received message based on the determination whether the domain has been spoofed, wherein:

the spam score is overridden and the received message is classified as good in accordance with the whitelist, the good classification based on the determination that the domain has not been spoofed, and the whitelist is overridden and the received message is classified as spam in accordance with the spam score assigned to the address-domain pair, the spam classification based on the determination that the domain has been spoofed.

\* \* \* \* \*